(12) United States Patent
Fukuhisa et al.

(10) Patent No.: US 6,516,401 B2
(45) Date of Patent: *Feb. 4, 2003

(54) DATA READING METHOD AND DATA READING APPARATUS

(75) Inventors: Ryoji Fukuhisa, Machida (JP); Hirofumi Saitoh, Chigasaki (JP); Shoichi Hirashita, Chigasaki (JP); Minoru Hashimoto, Sagamihara (JP)

(73) Assignee: International Business Machines Corporation, Armonk, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 09/827,603

(22) Filed: Apr. 6, 2001

(65) Prior Publication Data

US 2002/0023194 A1 Feb. 21, 2002

Related U.S. Application Data

(63) Continuation of application No. 09/140,616, filed on Aug. 26, 1998, now Pat. No. 6,249,854.

(30) Foreign Application Priority Data

Sep. 26, 1997 (JP) .............................................. 9-262368

(51) Int. Cl.[7] .............................................. G06F 12/00
(52) U.S. Cl. ........................ 711/218; 711/111; 711/112; 711/219
(58) Field of Search .................. 711/111–113, 217–219

(56) References Cited

U.S. PATENT DOCUMENTS

| 5,513,139 | A | * | 4/1996 | Butler .................... 365/189.04 |
| 5,721,815 | A | * | 2/1998 | Ottesen et al. ............... 345/327 |
| 5,790,264 | A | * | 8/1998 | Sasaki et al. ................ 358/433 |
| 6,249,854 | B1 | * | 6/2001 | Fukuhisa et al. ........... 711/218 |

* cited by examiner

Primary Examiner—Matthew Kim
Assistant Examiner—Pierre M. Vital
(74) Attorney, Agent, or Firm—William D. Gill

(57) ABSTRACT

The present invention provides, at a lower cost, a highly reliable data reading method and data reading apparatus that can improve backward sequential reading performance. The disk drive is provided with a magnetic disk and a control section having an HDC, a RAM, an MPU controlling the operation of the entire HDD, including control of the HDC, a ROM, and an I/F for connecting to an external host device. The control section executes a backward reading detection step that detects backward reading, a step of receiving a command that reads a block of a first length from a first LBA, a step that reads a block of the first length from the first LBA when backward reading is detected, and a step that pre-fetches a second block from a second LBA smaller than the first LBA; when backward reading is detected, upon completion of the reading of data from the disk, the reading of data predicted to be requested by the next command begins immediately.

6 Claims, 7 Drawing Sheets

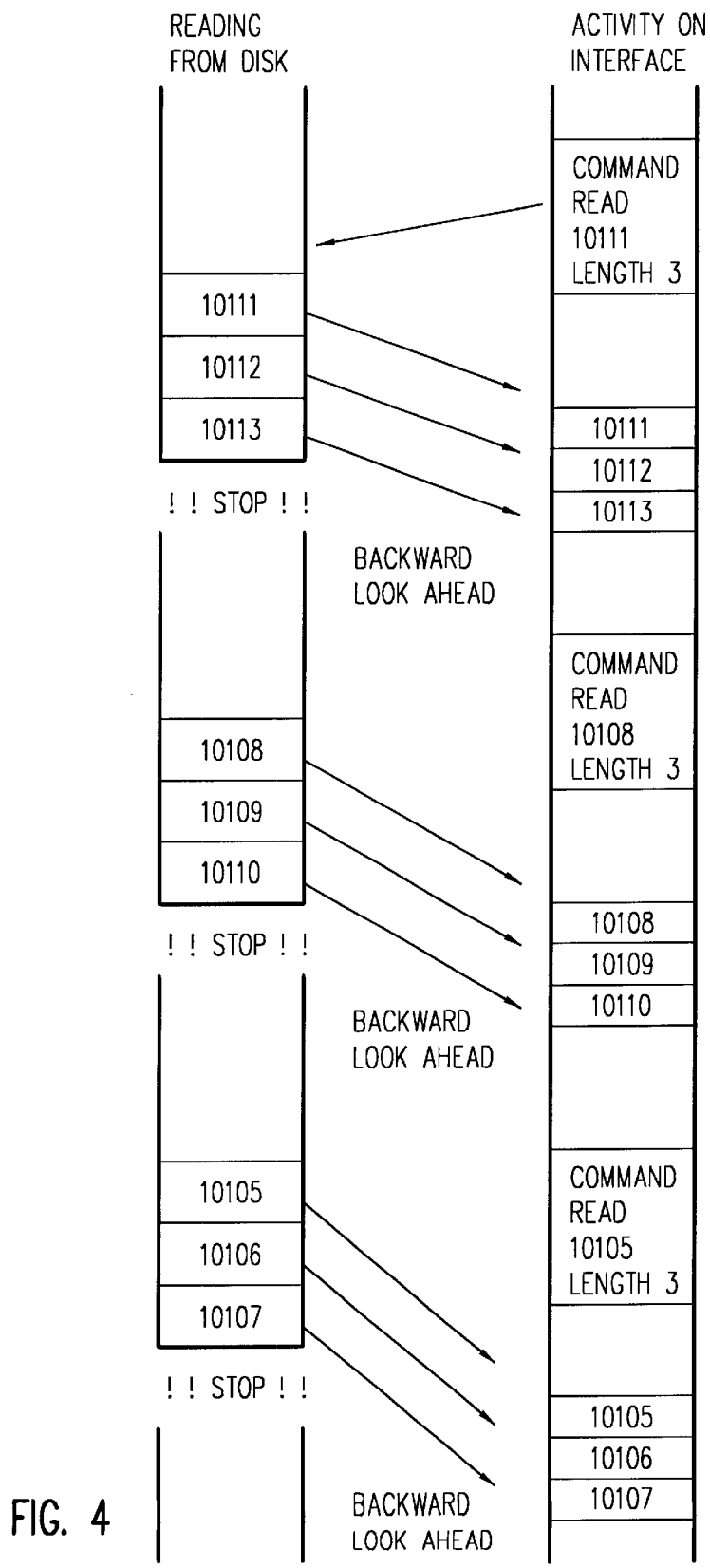

DATA READING METHOD AND DATA READING APPARATUS

CROSS REFERENCE TO RELATED APPLICATION

This application is a continuation of application Ser. No. 09/140,616 filed on Aug. 26, 1998 now U.S. Pat. No. 6,249,854, owned by a common assignee and having the same inventors as the present invention.

BACKGROUND OF THE INVENTION

1. Field of the Invention

The present invention relates to a data reading method and data reading apparatus used in a disk drive storage device such as a hard disk drive (HDD), and more particularly to a data reading method and data reading apparatus provided with a sector buffer having a caching function.

2. Description of Related Art

A memory referred to as a sector buffer is provided in disk drive apparatus. A common approach to speed up sequential reading in the disk drive is to continue reading in the following area (this is referred to as look-ahead) when the reading of an area requested by a read command has been completed. Sequential reading speed can thus be improved because when the next read command arrives the data will already be present in the sector buffer memory. The serial numbers assigned to usable sectors are referred to as logical block addresses (LBAs).

FIG. 7 is a diagram explaining the look-ahead operation, which illustrates reading from the disk and activity on the interface. The numbers in the drawing are addresses, and the arrows indicate the sequence of operations.

When the direction is forward, the existing method reads the specified data on the disk, then continues reading from the disk as long as there is space in the buffer memory. Accordingly, until a new read operation is performed, there will be data in the buffer memory, and that data can be transferred. This is a pre-fetch (look-ahead) operation. In the example in FIG. 7, when a first command (Read 10111 Length 3) is issued, the reading of the area (10111–10113) requested by the command is carried out from the disk with transfer on the interface. When the reading of the area requested by the read command has been completed, reading of the following area (10114 - - - ) continues.

Thus the read-cache process reads data that the host device commands to be read, or pre-fetches data predicted to be read in the future from the magnetic disk (look-ahead) and retains the data in a memory.

In conventional disk drives of this type, although sequential reading could be speeded up by look-ahead, no consideration was given to backward sequential reading. Thus, when backward sequential reading was performed, the operation of reading data from the disk would continue to be performed after the command arrived, with the problem that the processing took more time than for forward sequential reading.

This problem is heightened by the more recent use of disk drive storage devices such as HDDs for recording and editing video signals. Here, when the video signal is played in reverse, backward sequential reading is carried out on the HDD. Since backward reading performance is worse than in forward reading, the system must be designed on the basis of the backward sequential reading performance. When there is a large performance difference between backward sequential reading and forward reading, a design matched to the backward sequential reading performance underestimates the performance of the HDD, increasing the cost. If attempts are made to contain the cost, the stability of system operations cannot be guaranteed because backward reading margins are reduced.

Thus, it can be seen that there is a need in the art to provide a less expensive and highly reliable data reading method and apparatus that can improve backward sequential reading performance.

SUMMARY OF THE INVENTION

To overcome the shortcomings of the prior art described above, it is the object of the present invention is to provide a less expensive and highly reliable data reading method and data reading apparatus that can improve backward sequential reading performance.

A data reading method according to the present invention is a data reading method for reading data from a storage medium, comprising the steps of detecting backward reading, and carrying out control to start reading data from an address previous to a current address, upon completion of the reading of data from the storage medium.

A data reading method according to the present invention is a data reading method for reading data from a storage medium, comprising the steps of detecting backward reading, receiving a command to read a block of a first length from a first LBA, reading a block of the first length from the first LBA, and reading a block of a second length from a second LBA smaller than the first LBA.

The aforesaid step of detecting backward reading may check a backward sequential LBA, signifying backward reading, at each command, and recognize backward reading when the backward sequential LBA matches a certain number of times consecutively.

The aforesaid step of detecting backward reading may compare the average read length of one command with a segment size, and start to read from a point one segment size before when the read length is smaller than a certain value responsive to the segment size of a buffer.

The aforesaid step of detecting backward reading may start to read from the second LBA when the length of the data is a certain value responsive to the segment size of a buffer, or the aforesaid step of detecting backward reading may compare the average read length L of one command with a segment size, and return to the second LBA and start to read, when the read length is larger than a certain value responsive to the segment size of a buffer.

A data reading apparatus according to the present invention is a data reading apparatus for reading data from a storage medium, comprising a backward reading detection means for detecting backward reading, and a control means for starting to read data from an address previous to a current address, upon completion of the reading of data from the storage medium, when backward reading is detected by the backward reading detection means.

A data reading apparatus according to the present invention is a data reading apparatus for reading data from a storage medium, comprising a backward reading detection means for detecting backward reading, a means for receiving a command to read a block of a first length from a first LBA, a means for reading a block of the first length from the first LBA, when backward reading is detected by the detection means, and a means for reading a block of a second length from a second LBA smaller than the first LBA.

The above, as well as additional objects, features and advantages of the present invention will become apparent in the following detailed written description.

BRIEF DESCRIPTION OF THE DRAWINGS

FIG. 4 is a diagram for explaining the speeded-up backward reading operation in the aforesaid disk drive;

DETAILED DESCRIPTION OF THE PREFERRED EMBODIMENT

This invention is described in a preferred embodiment in the following description with reference to the Figures, in which like numbers represent the same or similar elements. While this invention is described in terms of the best mode for achieving this inventions objectives, it will be appreciated by those skilled in the art that variations may be accomplished in view of these teachings without deviating from the spirit or scope of the present invention. Further, the data reading method and data reading apparatus of the present invention can be applied in a small-form-factor HDD.

Figure 1:
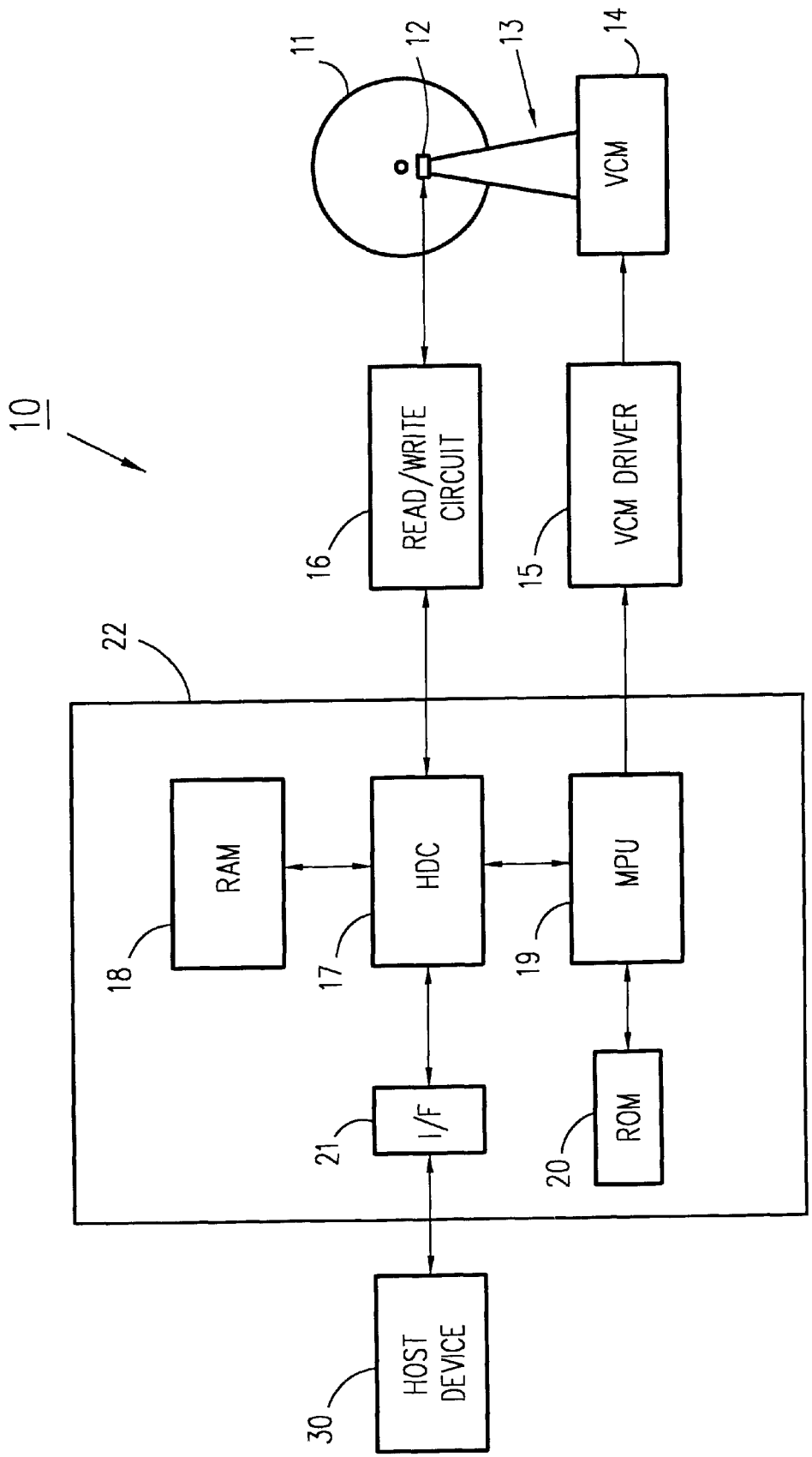
FIG. 1 is a block diagram showing the configuration of a disk drive according to an embodiment of the present invention.

FIG. 1 is a block diagram showing the configuration of a disk drive according to an embodiment of the present invention.

The magnetic disk drive (HDD) 10 in FIG. 1 comprises a magnetic disk 11, which is the data storage medium, a magnetic head 12 for carrying out the reading and writing of data on the magnetic disk 11, an actuator mechanism 13 for moving a head slider having the magnetic head 12 over the surface of the magnetic disk 11, and to a retracted position, a voice coil motor (VCM) 14 for rotationally driving the arm of the actuator mechanism 13, a VCM driver 15 for driving the VCM 14, including a spindle motor for rotationally driving the magnetic disk 11, a read/write circuit 16 incorporating a pick-up signal amplifying circuit, waveshaping circuit, analog-to-digital converter (ADC), digital-to-analog converter (DAC), and the like into a module, for controlling the reading and writing of data, a hard disk controller (HDC) 17 controlling operations such as the reading and writing of data on the magnetic disk, a RAM 18 in which supplied data is temporarily stored, and in which read/write data is cached, an MPU 19 that controls the operation of the entire HDD, including control of the HDC 17, a ROM 20 storing microprograms and data for operating the MPU 19, and an interface (I/F) 21 for connecting to an external host device 30 through a bidirectional channel.

The HDC 17, RAM 18, and MPU 19 are mutually interconnected by a data bus, the HDC 17 is connected to the MPU 19 by a control bus, and the HDC 17 is connected to the HDD's external host device 30 through the I/F 21.

Either an embedded servo (sector servo) system, in which tracks including both a data area in which data is recorded and a servo area in which servo data is pre-recorded are placed concentrically, or a dedicated servo system, in which one surface of the magnetic disk is used exclusively for servo data and the other magnetic disk surfaces are used for data, can be employed on the magnetic disk 11.

The HDC 17, RAM 18, MPU 19, ROM 20, and interface 21 collectively constitute a control section 22 that controls the operation of the entire HDD, and also controls the input and output of data to and from the external device (host device 30) connected through the I/F 21.

The control section 22 comprises the MPU 19 which executes control programs, and a memory that holds the control programs and holds such data as a defect map indicating the positions of bad sectors.

The memory comprises the RAM 18 and ROM 20; the control programs are stored in the ROM 20 or RAM 18. The programs stored in the RAM 18 are saved in a particular area on the magnetic disk 11, and are read into the RAM 18 and executed when power is switched on (at a power-on reset). The RAM 18 also functions as a cache memory, and has a memory capacity capable of holding several hundred of the recording units (sectors) on the magnetic disk, e.g. a capacity of 128 Kbytes (256 blocks).

By executing the control programs (microprograms), the control section 22 controls the operation of the disk drive as a whole, and controls read and write operations on the magnetic disk 11 according to commands and data supplied from the host device 30 through the I/F 21.

The MPU 19 in the control section 22 is able to execute multiple processes in parallel, one of these processes being the control of the input and output of commands and data to and from the host device 30, another being a write process that writes write data held in a buffer (RAM 18) onto the magnetic disk 11, and still another being a read-cache process that reads data that the host device 30 commands to have read, or pre-fetches data predicted to be read in the future, from the magnetic disk 11 (look-ahead) and places it in the buffer. Other processes, such as calculations for servo control and error recovery processing, are also executed in parallel.

In the process that controls the input and output of data to and from the host device 30, when supplied from the host device 30 with a command requesting the writing of data, an address (for example, a logical block address or LBA) specifying the write destination (sector on the magnetic disk 11), and the write data, the control section 22 places the supplied write data in the buffer. When a command requesting the reading of data and the address (LBA) at which the data to be read are stored is supplied from the host device 30, if the requested data has been read from the magnetic disk 11 and is held in the buffer, it is read out and supplied to the host device 30; if it is not held in the buffer, the read/write circuit 16 is commanded to read the requested data, and the read data is supplied to the host device 30.

In the write process, the control section 22 sequentially reads the write data that has been supplied from the host device 30 and is stored in the buffer as described above, and supplies it to the read/write circuit 16 with instructions to write the data on the magnetic disk 11.

In the read-cache process, the control section 22 instructs the read/write circuit 16 to read data that the host device 30 is predicted to request to have read in the future, and places the read data in the buffer.

In addition to the processes described above, the control section 22 here has a means of detecting backward reading; when backward reading is detected, upon completion of the reading of data from the magnetic disk 11, control is immediately carried out to start reading the data that the next command is predicted to request.

The operation of a disk drive 10 which is configured as described above will be described next, but first, the basic concept of the present invention will be explained.

In a hard disk read operation, the data read from the disk is stored temporarily in a memory in the hard disk drive, then transferred to the host device over the interface. Accordingly, the data is actually transferred after the reading of the data from the disk is completed, so there is some time until the next command is executed.

It can easily be detected, by looking at the command stream, that backward reading is being carried out, so in the present invention, when it is detected that backward reading is being carried out, as soon as the reading of the data from the disk is completed, the reading of the data predicted to be requested by the next command begins. The reading of the data can therefore begin before the next command arrives.

Backward reading will now be described in detail.

Figure 2A:
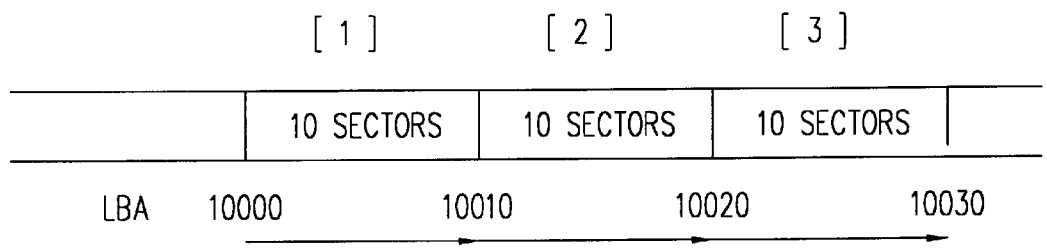
FIGS. 2(a)–2(c) are a diagram for explaining backward reading in the aforesaid disk drive.
Figure 2B:
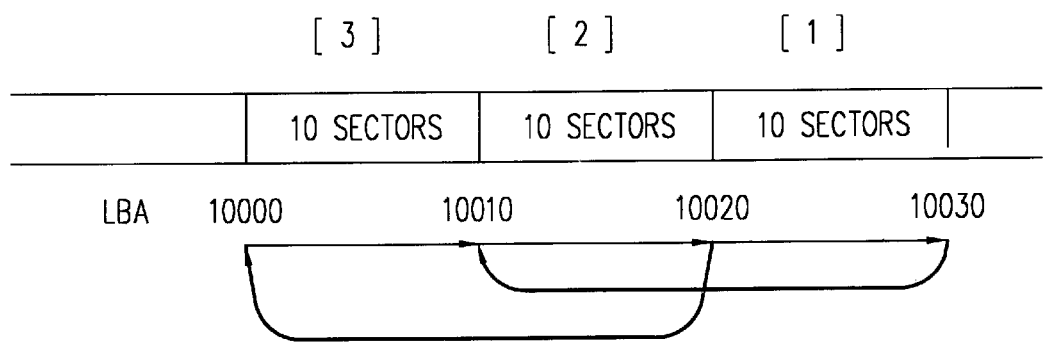
Figure 2C:

FIGS. 2(*a*)–2(*c*) are a diagram for describing backward reading, in which FIG. 2(*a*) shows sequential access, FIG. 2(*b*) shows backward sequential access, and FIG. 2(*c*) shows an example of a video signal when backward sequential access is performed. The numbers in brackets indicate the access sequence.

In the reading of data a certain number of sectors at a time from a given address (for example, ten sectors at a time from LBA 10000), sequential access (forward reading) operates as shown in FIG. 2(*a*). In contrast, in backward sequential access, as shown in FIG. 2(*b*), first data [1] (10 sectors from LBA 10020) is read as shown in FIG. 2(*b*); next, as shown by the dotted line, a return is made to LBA 10010 and data [2] (10 sectors from LBA 10010) is read; then a return is made to LBA 10000 and data [3] (10 sectors from LBA 10000) is read. For convenience of explanation, the number of sectors read was ten sectors in the above description, but backward sequential reading for reverse playback can be taken as an actual example of backward reading. There is, for example, the frame-by-frame reverse playback of a video television signal, as shown in FIG. 2(*c*).

In the present invention, when the HDD receives a command, the MPU checks the command and decides whether backward sequential access is present. Rotational latency can be reduced by finding the length of the data accessed at one time, and (1) starting to read from the start of the next expected command, if the data length would be too big to fit within the segment size, or (2) starting to read from a point one segment size before, if the length of the data accessed at one time is short, and the data will fit within the segment size of the buffer.

Next, the method of detecting backward reading will be described.

Figure 3A:
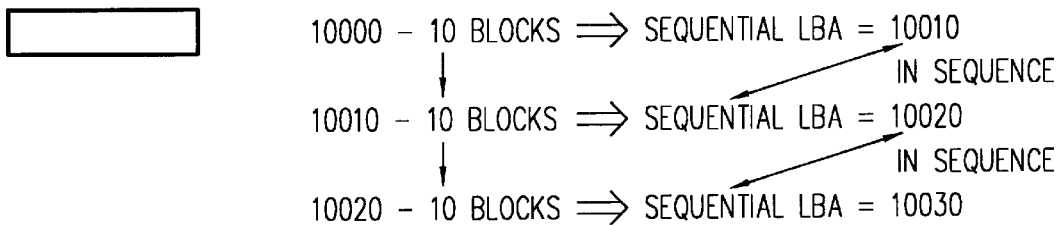
FIGS. 3(a)–3(b) are a diagram for explaining the backward reading detection method in the aforesaid disk drive.
Figure 3B:
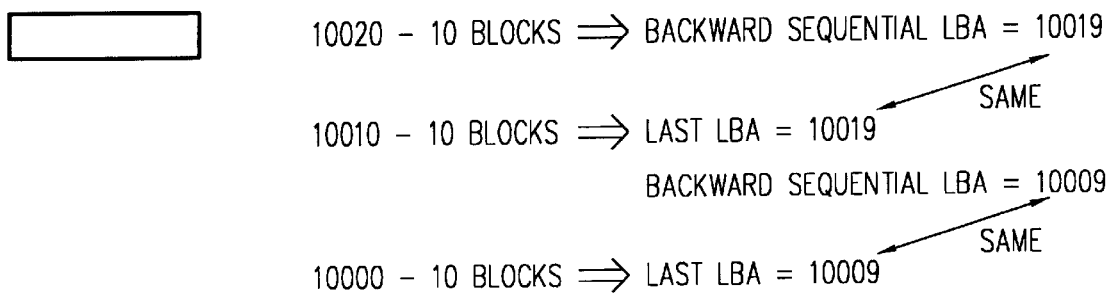

FIGS. 3(*a*) and 3(*b*) are a diagram for explaining the method of detecting backward reading; as a comparative example for describing backward sequential access, FIG. 3(*a*) shows an example of the commands of a sequential LBA series in a look-ahead operation, while FIG. 3(*b*) shows the commands of a backward sequential LBA series.

In FIG. 3(*a*), a sequential LBA area is reserved in the memory, and when a command arrives, an address and block length are stored in the sequential LBA area. For example, when the command '10 blocks from LBA 10000' arrives, the sequential LBA is LBA 10010, which is ten blocks ahead. When the next command arrives (10 blocks from LBA 10010), the sequential LBA is set to LBA 10020, ten blocks ahead. The sequential LBA is checked at every command, and when the sequential LBA matches a certain number of times consecutively, sequential access is recognized. This type of recognition of sequential access has been performed in the past to speed up sequential read access.

Backward sequential read access is detected by a method similar to the above sequential LBA method.

In FIG. 3(*b*), a backward sequential LBA area is reserved in the memory, and when a command arrives, an address and (block) length are stored in the backward sequential LBA area. An example in which the arriving commands are a '10 blocks from LBA 10020' command, a '10 blocks from LBA 10010' command, and a '10 blocks from LBA 10000' command will be taken. First, when 10 blocks from address 10020 arrives, the LBA 10019 one block before the leading address is set in the backward sequential LBA area.

The reasons for setting the backward sequential LBA one block before the leading address and not 10 blocks before are that the backward sequential LBA will not necessarily be 10 blocks (sectors) before, but if it is set at least one before the leading address, the backward sequential linking can be recognized reliably.

In FIG. 3(*b*), when the command '10 blocks from LBA 10020' arrives, the backward sequential LBA is set to LBA 10019, one block before the starting address. If the command '10 blocks from LBA 10010' arrives next, the backward sequential LBA at that point will be LBA 10009, one block before. The contents of the backward sequential LBA are checked in this way, and when the backward sequential LBA matches a certain number of times consecutively, backward sequential access is recognized.

When backward sequential access is detected in this way, backward reading is speeded up on the basis of the backward sequential LBA.

The basic concept of the speed-up method will be explained below.

Letting L be the average read length of one command, L is compared with the segment size.

When L is compared with the segment size:

If L is smaller than half the segment size (½ segment size>L)  (1)

When the length L per read is smaller than one-half the segment size, this means that at least two pre-fetches will be possible in the look-ahead. The read start point is then shifted back by an amount equal to the segment size. In this case (1), the time can be greatly shortened, because reading can start immediately, with no rotational latency. This case (1) will be described later, using FIG. 4;

If L is equal to or greater than half the segment size (½ segment size≦L)  (2)

When L is equal to or greater than half the segment size, only the data for one command can be pre-fetched. Since rotational latency is unavoidable, the read start point is shifted back to the starting LBA of the command that is expected to arrive next. In this case (2), the time until the command actually arrives can be shortened.

The following effects can be obtained by comparing ½ the segment size with the average length L. When ½ segment size>L, multiple pre-fetches may be possible, but when ½ segment size≦L, it is not possible to pre-fetch for two commands; in this situation, when only one pre-fetch is possible, going farther back would be meaningless, because the data would not fit into the buffer. The meaningless pre-fetch is therefore not performed, but some speed-up can still be obtained by shifting back to the starting LBA of the command and starting to read from there.

FIG. 4 is a diagram for explaining the speeded-up backward reading operation, showing the reading from the disk and the activity on the interface. A comparison with the look-ahead in FIG. 7 will facilitate understanding.

Figure 7:
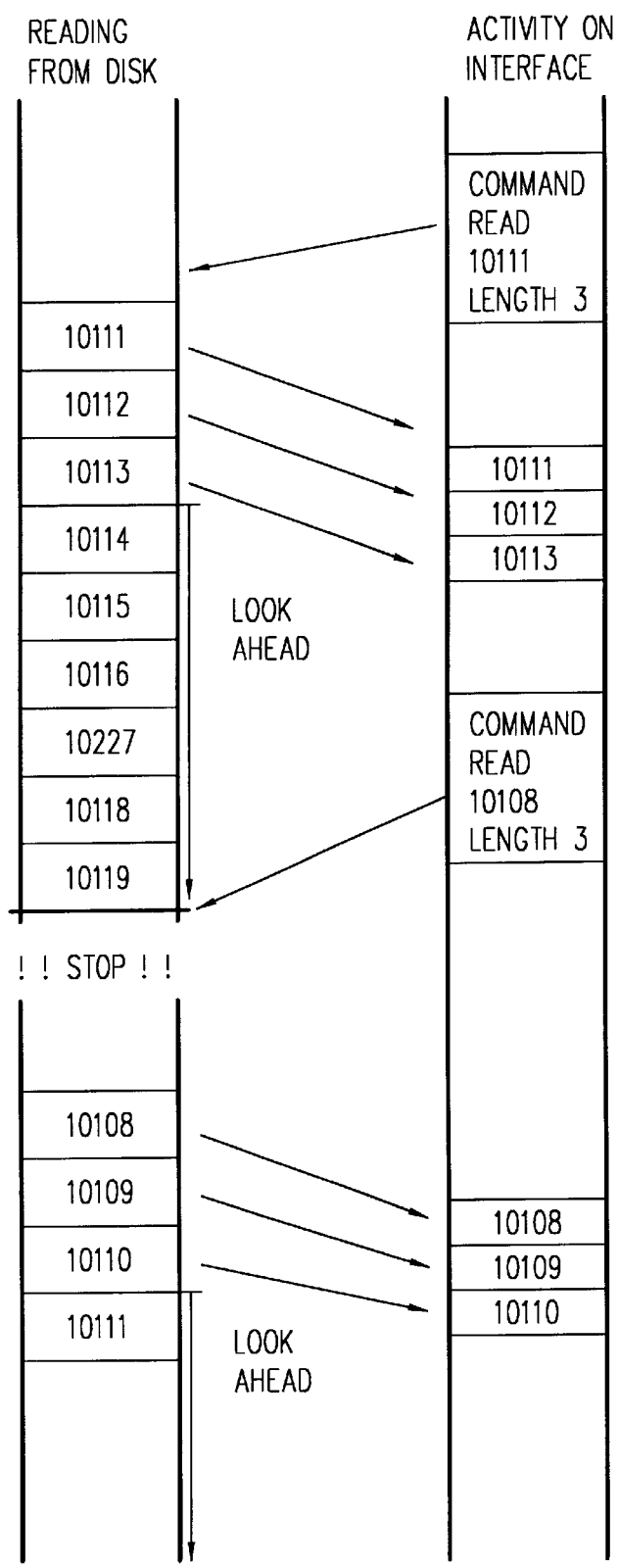
FIG. 7 is a diagram for explaining pre-fetch (look-ahead) operations in a conventional disk drive.

In the existing method shown in FIG. 7, the specified data on the disk is read, then reading from the disk continues in the forward direction, as long as there is space in the buffer.

In the speeded-up backward reading operation, in contrast, as shown in FIG. 4, the specified data on the disk is read, and reading from the disk stops when the reading of those sectors is completed. That is, only the sectors requested by the command are read from the disk. As soon as the command request has been dealt with, a backward look-ahead starts, based on the command predicted to come next. When the predicted next command arrives, the data pre-fetched from the disk by the backward look-ahead is transferred.

In the example in FIG. 4, when the first command (Read 10111 Length 3) is issued, the sectors requested by the command to be read from the disk (LBA 10111–10113) are read and transferred on the interface, and when the reading of the sectors has finished, reading from the disk stops. Immediately afterward, a backward look-ahead operation begins, in which the reading of the sectors (10108–10110) predicted to be requested by the next command is performed. When the predicted next command (Read 10108 Length 3) is issued, the sectors (LBA 10108–10110) pre-fetched from the disk by the backward look-ahead are transferred immediately. When the reading of these sectors (LBA 10108–10110) is finished, reading from the disk again stops. Similarly, a next backward look-ahead operation begins, and the sectors (10105–10107) predicted to be requested by the next command are read; when the predicted next command (Read 10105 Length 3) is issued, the sectors (LBA 10105–10107) pre-fetched from the disk by the backward look-ahead are transferred immediately.

Next, the operation of the disk drive 10 will be explained in detail with reference to a flowchart, based on the basic concepts described above.

Figure 5:
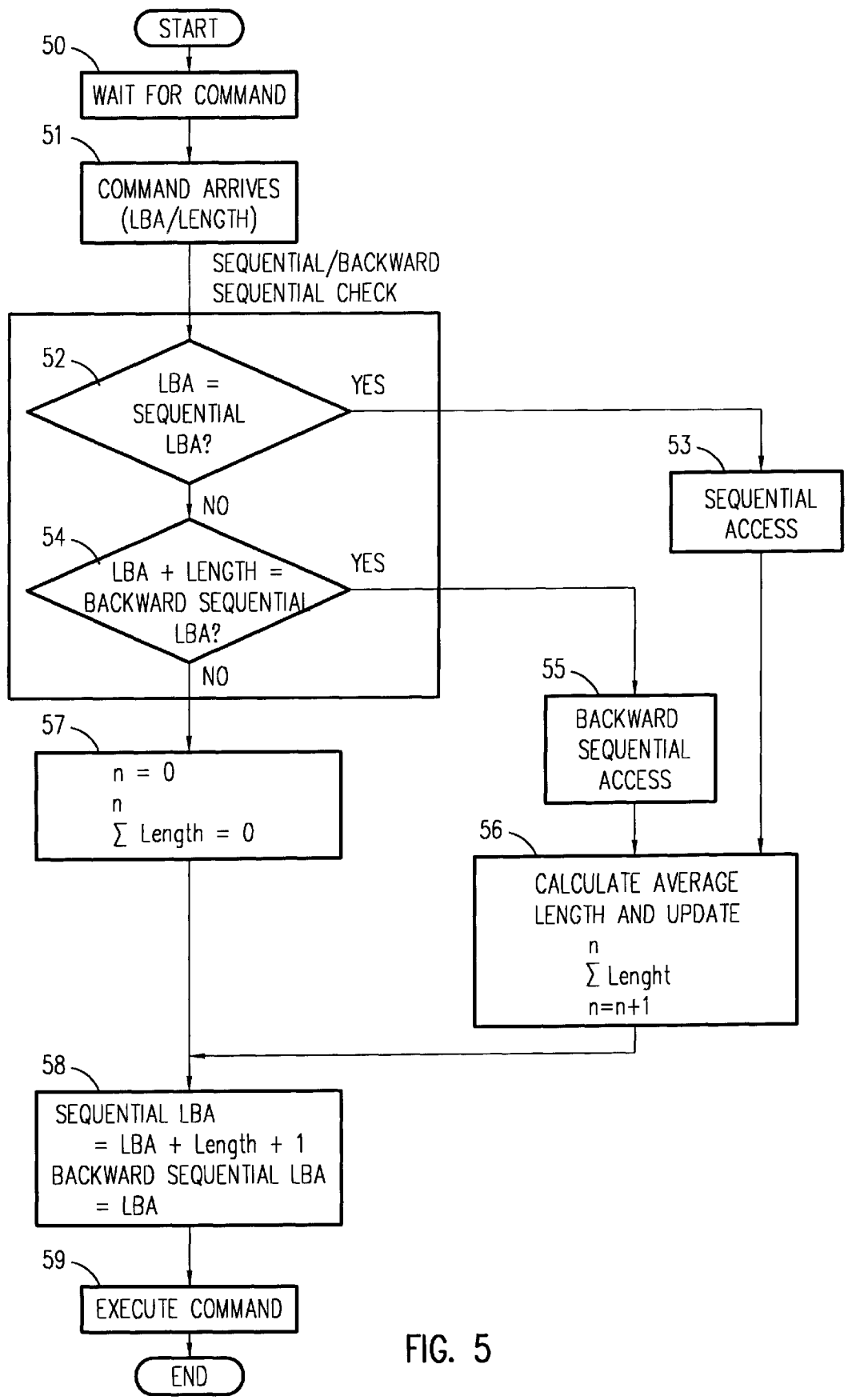
FIG. 5 is a flowchart for backward reading detection in the aforesaid disk drive.

FIG. 5 is a flowchart for detecting backward reading, the flow being executed by the MPU 19. First, a command is awaited in step 50, and when a command arrives, the LBA and length are obtained in step 51. Next, a sequential/backward sequential check begins; specifically, whether the LBA is the sequential LBA is determined in step 52, and if the LBA is the sequential LBA, sequential access as shown in FIG. 7 is carried out in step 53, followed by step 56.

If the LBA is not the sequential LBA, in step 54 whether LBA+Length (the length in the command) is the backward sequential LBA is determined; if it is the backward sequential LBA, backward sequential access as shown in FIG. 4 is carried out in step 55, followed by step 56.

In step 56, the average length of the data (sectors) is calculated for use in look-ahead. Specifically, the sum of n lengths (Σ Length) is updated, and n is incremented (n=n+1). The average length (Σ Length/n) here finds the average length in one command when n sequential (or backward sequential) commands arrive. The backward sequential shift length is determined on the basis of this average length. If the determination in step 54 is that the LBA is not the backward sequential LBA, random access is recognized, and the value of n and the sum of the lengths (Σ Length) are reset to zero in step 57 (n=0, Σ Length=0).

Next, in step 58 the sequential LBA and backward sequential LBA are updated to match the LBA of the next command. Specifically, for the sequential LBA, the length and one sector are added to the LBA to obtain the sequential LBA of the next command (LBA+Length+1), and for the backward sequential LBA, the current LBA minus one is set as the backward sequential LBA.

Next, the command is executed in step 59, and the flow ends with a return to step 50 to await the next command. Command execution will be described in FIG. 6.

Figure 6:
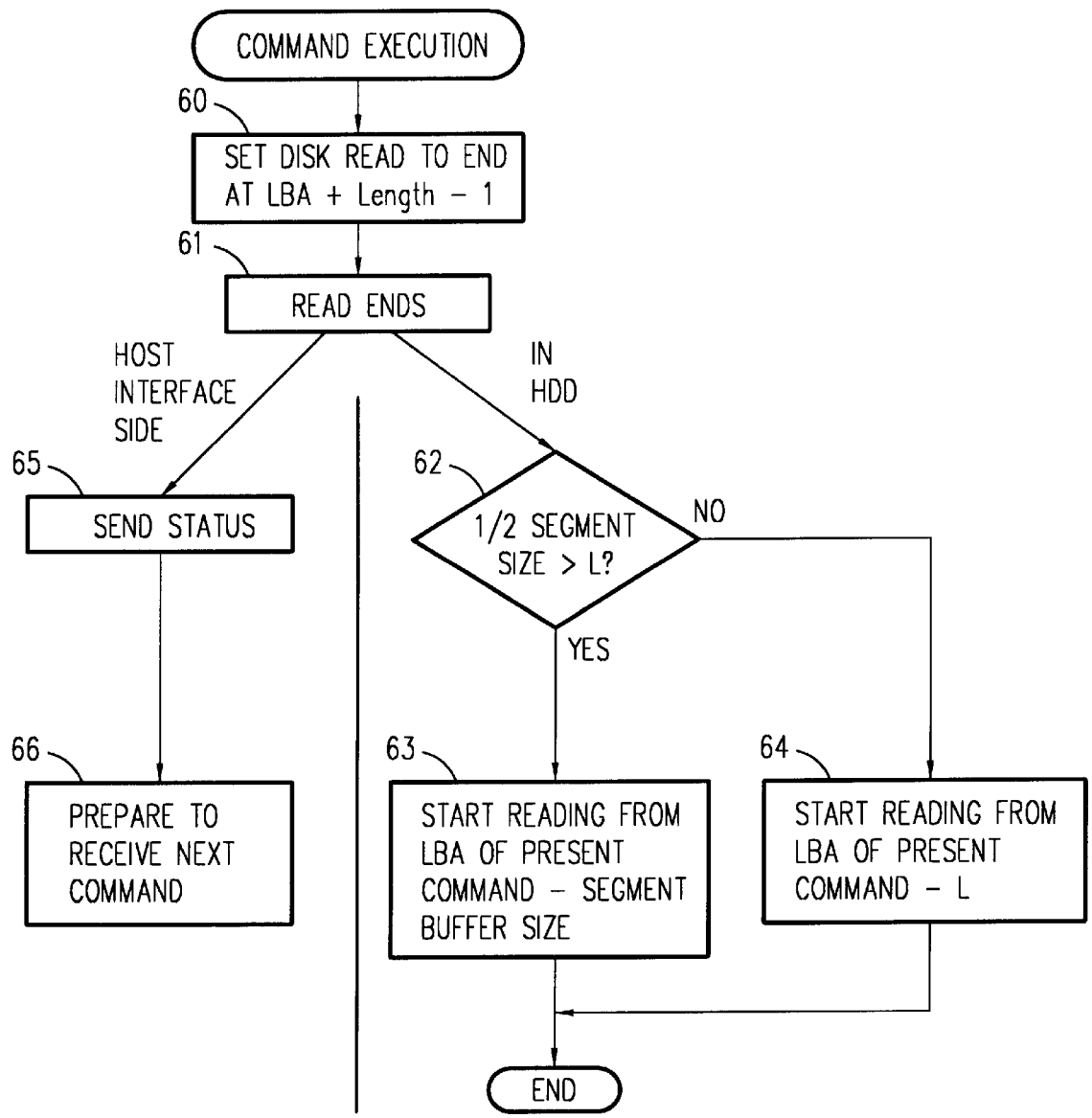
FIG. 6 is a flowchart showing command execution operations in the backward sequential operation mode of the aforesaid disk drive.

FIG. 6 is a flowchart showing a command execution operation, illustrating the flow in the backward sequential operation mode.

First, when command execution processing begins, in step 60, reading from the disk is set to end at a point (LBA+Length−1) obtained by adding the length in the command to the LBA in the command, and subtracting one sector.

When the reading ends in step 61, the following operations take place on the host interface side and inside the HDD.

On the host interface side, status is sent in step 65, and preparations to receive the next command are begun in step 66. In the HDD, whether ½ segment size>L (L being the average length) is determined in step 62. This is done to execute speedup method (1) or (2) described above.

If ½ segment size>L, pre-fetching is possible for multiple commands, so in step 63, the read start point is set to the point preceding the LBA of the current command by the segment buffer size, and the flow ends. In this case, the time can be greatly shortened because at least two pre-fetches are possible.

If ½ segment size≦L, pre-fetching for multiple commands is not possible, so the read start point is set to the point preceding the LBA of the current command by the average length L, and the flow ends. In this case, although a major speed-up by is not possible by pre-fetching, the time until the command actually arrives can be shortened.

As explained above, a disk drive 10 according to the present embodiment is provided with a magnetic disk 11 and a control section 22 comprising an HDC 17, a RAM 18 in which read and write data are cached, an MPU 19 that controls the operation of the entire HDD, including control of the HDC 17, a ROM 20 storing microprograms and the like, and an I/F 21 for connecting to an external host device 30; the control section 22 executes a backward reading detection step that detects backward reading, a step of receiving a command that reads a block of a first length from a first LBA, a step that reads a block of the first length the first LBA when backward reading is detected, and a step that pre-fetches a second block from a second LBA smaller than the first LBA; when backward reading is detected, upon completion of the reading of data from the disk, the reading of data predicted to be requested by the next command begins immediately, so backward sequential reading performance can be improved, and a less expensive and highly reliable data reading system can be realized.

The present embodiment also performs optimized backward look-ahead, according to whether or not pre-fetching for multiple commands is possible, by comparing half the segment size and the average length L, so rotational latency can be minimized, without loss of performance.

The present embodiment can furthermore be implemented without additional circuitry or the like, and can of course be used in parallel with conventional forward look-ahead. It therefore has the excellent effect of being easy to implement at a low cost, without leading to changes in system operations.

The present embodiment described an application of the present invention to an HDD, but this is not a restriction; the invention can be practiced in any type of disk drive having a cache memory. External storage devices other than HDDs, such as magneto-optic disks, can be used, for example, and effects similar to those in the embodiment above can be obtained.

The present embodiment compares ½ of the segment size with the average length L to determine whether pre-fetching for multiple commands is possible or not, but needless to say, comparison with the average length L is only one example. It need not be ½ of the segment size, for example, and a certain tolerance can be provided for the average length L. Also, any method may be used to calculate the average length per command.

Needless to say, the HDC, memory, MPU and other elements constituting the aforesaid disk drive are not restricted in type, number, or other attributes to the embodiment described above.

In a data reading method and data reading apparatus according to the present invention, when backward reading is detected, upon completion of the reading of data from the storage medium, the reading of data from an address before the current address is begun, so performance in backward sequential reading can be improved, and highly reliable data reading can be realized at a lower cost.

While the present invention has been particularly shown and described with reference to the preferred embodiments, it will be understood by those skilled in the art that various changes in form and detail may be made without departing from the spirit, scope and teaching of the invention. Accordingly, the disclosed invention is to be considered merely illustrative and limited in scope only as specified in the appended claims.

What is claimed is:

1. A data reading apparatus for reading data from a storage medium, comprising:
    a backward reading detection means for checking a backward sequential LBA, signifying backward reading, at each command and recognizing backward reading when the backward sequential LBA matches a certain number of times consecutively; and
    a control means for starting to read data from an address previous to a current address upon completion of the reading of data from said storage medium when backward reading is detected by said backward reading detection means.

2. A data reading apparatus for reading data from a storage medium, comprising:
    a backward reading detection means for checking a backward sequential LBA, signifying backward reading, at each command and recognizing backward reading when the backward sequential LBA matches a certain number of times sequentially;
    a means for receiving a command to read a block of a first length from a first LBA;
    a means for reading a block of the first length from said first LBA when backward reading is detected by said detection means; and
    a means for reading a block of a second length from a second LBA smaller than said first LBA.

3. A data reading apparatus for reading data from a storage medium, comprising:
    a backward reading detection means for comparing the average read length of one command with a segment size and starting to read from a point shifted back by one segment size when the read length is smaller than a certain value responsive to the segment size of a buffer; and
    a control means for starting to read data from an address previous to a current address upon completion of the reading of data from said storage medium when backward reading is detected by said backward reading detection means.

4. A data reading apparatus for reading data from a storage medium, comprising:
    a backward reading detection means for comparing the average read length of one command with a segment size and starting to read from a point shifted back by one segment size when the read length is smaller than a certain value responsive to the segment size of a buffer;
    a means for receiving a command to read a block of a first length from a first LBA;
    a means for reading a block of the first length from said first LBA when backward reading is detected by said detection means; and
    a means for reading a block of a second length from a second LBA smaller than said first LBA.

5. A data reading apparatus for reading data from a storage medium, comprising:
    a backward reading detection means for starting to read from a second LBA when the length of the data is a certain value responsive to the segment size of a buffer;
    a means for receiving a command to read a block of a first length from a first LBA;
    a means for reading a block of the first length from said first LBA when backward reading is detected by said detection means; and
    a means for reading a block of a second length from a second LBA smaller than said first LBA.

6. A data reading apparatus for reading data from a storage medium, comprising:
    a backward reading detection means for comparing the average read length L of one command with a segment size and returning to a second LBA and starting to read when the read length L is larger than a certain value responsive to the segment size of a buffer;
    a means for receiving a command to read a block of a first length from a first LBA;
    a means for reading a block of the first length from said first LBA when backward reading is detected by said detection means; and
    a means for reading a block of a second length from a second LBA smaller than said first LBA.

* * * * *